United States Patent [19]

Holmes

[11] 4,391,299
[45] Jul. 5, 1983

[54] ELECTRO FLUIDIC ACTUATOR

[75] Inventor: Allen B. Holmes, Rockville, Md.

[73] Assignee: The United States of America as represented by the Secretary of the Army, Washington, D.C.

[21] Appl. No.: 142,547

[22] Filed: Apr. 21, 1980

[51] Int. Cl.³ ............................................. G01V 1/04
[52] U.S. Cl. .................................. 137/831; 367/171; 367/172; 181/120
[58] Field of Search ...................... 137/831; 92/34, 37, 92/40, 43, 47; 60/545, 581, 586; 417/412, 414, 417, 418; 367/166, 167, 171, 172; 181/120

[56] References Cited

U.S. PATENT DOCUMENTS

| | | | |
|---|---|---|---|
| 2,283,886 | 5/1942 | Henkell | 417/418 |
| 2,429,104 | 10/1947 | Olson | 367/172 |
| 2,490,595 | 12/1949 | Merten | 367/171 |
| 2,592,134 | 4/1952 | Firestone | 367/166 |
| 2,903,673 | 9/1959 | Harris | 367/172 |
| 2,934,900 | 5/1960 | Robinson | 92/34 |
| 3,176,703 | 4/1965 | Sparrow | 137/831 |
| 3,276,463 | 10/1966 | Bowles | 137/831 |
| 3,790,928 | 2/1974 | Schoen, Jr. | 367/172 |
| 3,877,486 | 4/1975 | Merrell et al. | 137/831 |
| 4,078,620 | 3/1978 | Westlake et al. | 176/48 |
| 4,276,943 | 7/1981 | Holmes | 137/810 |
| 4,291,395 | 9/1981 | Holmes | 367/83 |
| 4,323,991 | 4/1982 | Holmes et al. | 367/83 |

OTHER PUBLICATIONS

A Fluidic Approach to the Design of a Mud Pulser for Bore-Hole Telemetry While Drilling, Holmes, Allen B., Harry Diamond Lab-TM-79-21, 1979.

Primary Examiner—A. Michael Chambers
Attorney, Agent, or Firm—Robert P. Gibson; Anthony T. Lane; Saul Elbaum

[57] ABSTRACT

An electro-hydraulic (EH) actuator for converting electrical inputs into hydraulic output signals is described. The actuator features a pressure balanced design which permits operation at high absolute pressures without performance degradation. Internal portions of the EH actuator are filled with a non-conducting fluid, while a flexible diaphragm provides a movable interface between the fluid and the environment in order to equalize the internal and external pressures on the actuator.

5 Claims, 9 Drawing Figures

ELECTRO FLUIDIC ACTUATOR

RIGHTS OF THE GOVERNMENT

The invention described herein may be manufactured and used by or for the government of the United States for governmental purposes without the payment to me of any royalties thereon.

BACKGROUND OF THE INVENTION

Electro-hydraulic actuators can be used as signal generators in general hydraulic applications. Of particular interest is the use of an EH actuator in conjunction with a fluidic mud-pulse telemetry transmittor. Mud-pulse telemetry is a technique for transmitting information from the bottom of a well bore to a position at the top of the well where the information may be utilized to control the drilling operation. Sensors located near the drill bit provide electrically coded signals representative of conditions such as temperature, pressure, etc. existing at the bottom of the wellbore. These signals are applied to an EH actuator which controls the operation of a fluidic pulsing device. Pulses are generated in the drilling fluid which flows through the drill string, and may be detected by suitable transducers located at a convenient position at the well head. The coded information represented by the pulses may be interpreted by the drill string operator for use in controlling the drilling operation. The operation of a mud-pulse telemetry system is more particularly described in U.S. Pat. No. 4,276,943 issued July 7, 1981 to Holmes and in U.S. Pat. No. 4,323,991 issued Apr. 6, 1982 to Holmes et al., the disclosures of which are incorporated herein by reference.

In most drilling operations pressures at the drill bit are extremely high, generally on the order of 20,000 psi. Electro-hydraulic actuators currently known are incapable of operating efficiently at such high pressures. Generally, a great deal of power must be provided to the actuator in order to counteract the high pressure and provide a control impulse. This is troublesome as power at the drill bit is generally limited, normally being provided by batteries or a low powered mud turbine. Also, the tremendous pressures encountered by the actuator normally slow the actuators response time to a rate which is insufficient to transmit adequate amounts of data to the drill bit operator.

Accordingly, it is an object of this invention to provide an EH actuator which is capable of operation at very high bore hole pressures with only minimal electrical power.

It is an object of the invention to provide such an actuator having a rapid response rate at high pressures enabling the device to transmit large quantities of information as required in a mud-pulse telemetry system.

It is yet another object of the invention to provide an EH actuator which is durable when operating under very high pressure conditions, the components of which are insulated from the corrosive and erosive effects of working fluids.

SUMMARY OF THE INVENTION

The actuator of the present invention comprises a casing or housing which contains a solenoid actuated plunger for generating hydraulic pressure pulses. A flexible diaphragm or bellows extends between the plunger faces and the housing. All internal portions of the actuator are filled with a non-conducting fluid, while a flexible diaphragm provides an interface for equalizing the internal and external pressures acting on the actuator.

DESCRIPTION OF THE PREFERRED EMBODIMENTS

Figure 1:
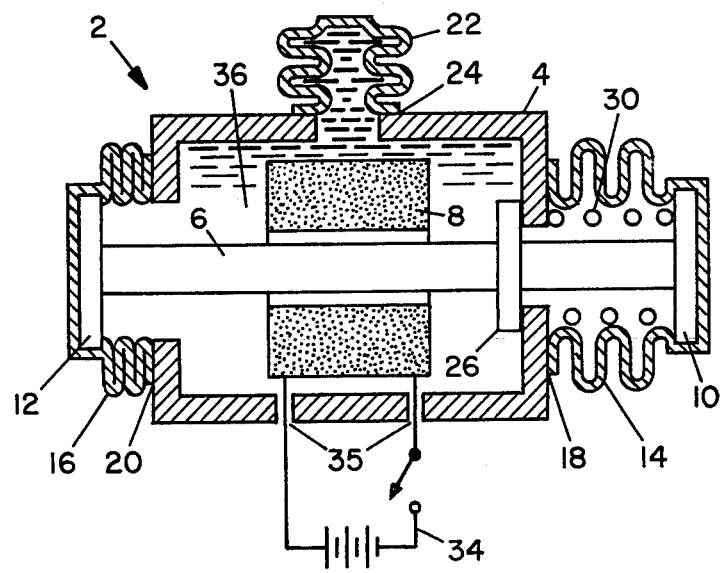
FIGS. 1-3 illustrate various embodiments of the present invention.

FIG. 1 illustrates a first embodiment of the actuator, generally designated by the reference numeral 12. The actuator comprises a housing 4 containing a coil 8 and the plunger or rod 6 which extends axially through opposite openings 7, 9 in the housing 4. The housing 4 is generally made of iron to provide a magnetic circuit. The rod 6 has working faces 10 and 12 at the ends thereof, and an annular stop member 26 secured thereto. Flexible diaphragms, shown here as lightweight, low inertia, highly compliant, metallic bellows 14 and 16, extend between the working faces 10 and 12, respectively, and the housing 4. The bellows 14, 16 include closed outer end portions 13, 15 which respectively overlie and connect with the rod working faces 10, 12, pleated side portions 17, 19 which extend coaxially along the rod 6, and open inner end portions 18, 20 which are secured to the housing 4 about the openings 7, 9, respectively by means of a permanent metallic bond such as welding or brazing. The diameters of the housing openings 7 and 9 are considerably larger than the diameter of the rod 6 extending concentrically through these openings 7 and 9, to provide passages between the interior of the housing 4 and the interiors of the bellows 14 and 16, respectively.

The actuator comprises an additional lightweight, low inertia, highly compliant, bellows 22, similar to the bellows 14 or 16. This bellows is also metallic, and includes an open inner end portion 24 which is permanently secured to the housing 4 concentrically about another opening 21 of the housing 4. As shown in FIG. 1, the diameter of the housing opening 21 is larger than the minimum diameter of the pleated side portion 23 extending between the inner end portion 24 and the closed outer end portion 25 of the bellows 22, to establish essentially unrestricted communication between the interior of the housing 4 and the interior of the bellows 22. Switch circuit 34 provides power to the coil 8 by means of electrical leads which pass through openings 35 in the housing. These openings 35 are sealed by suitable means such as epoxy. Thus, the housing 4 and the bellows 14, 16 and 22 bonded thereto form a completely sealed and fluid tight enclosure for the elements of the actuator.

The internal portion of the actuator is filled with a non-conducting fluid 36 which is, for example, Dow Corning silicon oil or other transformer oils which are well known. This fluid provides for electrical insulation of the internal contacts and for maintaining internal pressure. When the actuator is submerged in a fluid, such as the drilling fluid passing through a drill string, external pressure acting on bellows 22 will pressurize the fluid 36 inside the actuator housing. This will transmit the external pressure to all of the internal elements of the actuator device. Since the bellows 22 is free to move and react to changes in the external pressure, the pressure inside the actuator will always be equal to the pressure on the exterior thereof.

This equalization of pressure results in a zero net force acting on all working elements of the actuator. There is no existing pressure differential which must be overcome by the device. Therefore, the electrical power necessary to move the rod 6 and create a pressure pulse is greatly reduced as compared to prior art devices. Also, the reduced pressure eliminates much or all of the strain normally imposed on the structural elements of the apparatus.

In operation, when the circuit 34 is in opened condition as shown in FIG. 1, the rod or plunger 6 is urged to the right by means of spring 30 compressed between the housing and the working face 10. Travel of the plunger to the right is limited by abutment of element 26 with the housing 4. If a control signal is provided to circuit 34, thereby closing the circuit, coil 8 is energized urging plunger 6 to the left against the action of the spring 30. Travel of the plunger to the left will be limited by the fact that spring 30 is interposed between the housing and the working face 10. As the plunger moves to the left, the bellows 16 will be extended while the bellows 14 will be compressed. A positive pressure pulse will be generated in the fluid contacting the face of the working element 12. When the circuit 34 is again opened, the spring 30 will urge the plunger 6 back toward the right thus generating a pressure pulse in the fluid contacting the face of the working element 10.

Figure 2:
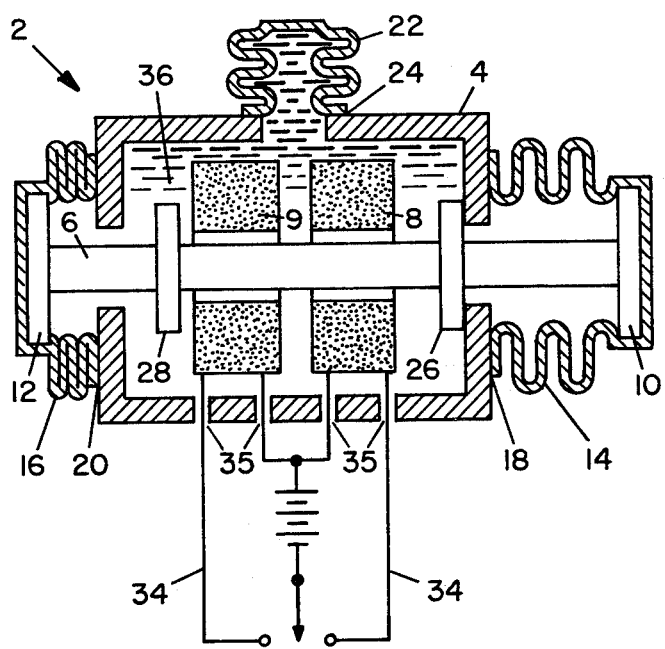

FIG. 2 shows another embodiment of the present invention which is substantially similar to that of FIG. 1, similar elements being denoted by like reference numerals. In this embodiment the spring 30 is eliminated and a second coil 9 is provided. The electrical circuit is modified so that either of coils 8 or 9 may be energized by closing either of circuits 34 or 34', respectively. When coil 8 is energized the plunger 6 is urged to the right, while the coil 9 will urge the plunger to the left. Alternately energizing the two coils will cause the plunger or rod 6 to oscillate back and forth. Travel of the plunger is limited by the abutment elements 26 and 28.

The embodiments of FIG. 2 is capable of more rapid oscillation than that of FIG. 1. Therefore, more rapid control of a fluidic pulsing device may be achieved. The travel rate of the plunger 6 in either the left or the right directions is determined by the magnetic circuit rather than the spring as shown in FIG. 1. Also, since the plunger would not have to work against the spring in travelling in the left direction, response time will be reduced as well as the power required to move the plunger. Due to the pressure balanced design of the present invention, this action can be accomplished regardless of the magnitude of the external ambient pressure.

Figure 3:
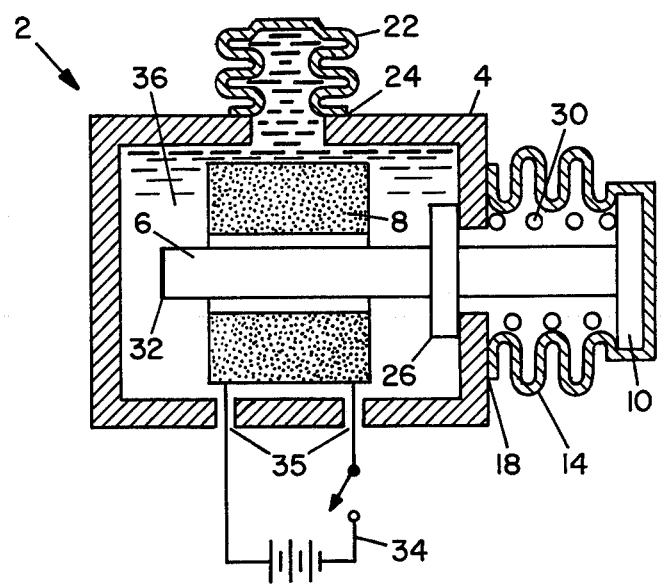

FIG. 3 shows an embodiment of the present invention substantially similar to that of FIG. 1. In this embodiment, the plunger 6 comprises only a single working face 10. When circuit 34 is closed the plunger 6 will be urged to the left, thus creating a negative pressure pulse in the fluid contacting the working face 10. When the circuit is again opened, spring 30 will urge the plunger back toward the right, generating a positive pressure pulse in the fluid contacting the working face.

Figure 4:
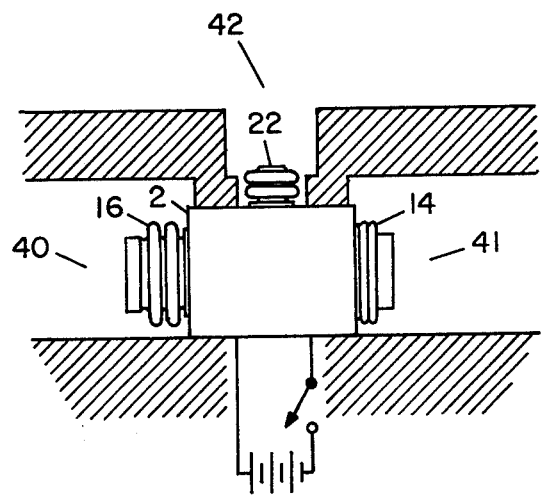
FIG. 4 illustrates the manner in which the actuator of the present invention may be mounted in the control passages of a fluidic device.

FIG. 4 illustrates the manner in which the EH actuator of the present invention is mounted in a fluidic pulsing device. The actuator 2 is positioned at the junction of control channels 40 and 41 of the amplification device. An additional opening 42 is provided in the amplification device to facilitate exposure of the diaphragm 22 to ambient fluid pressure. The actuator shown in FIG. 4 is constructed in the manner as shown in FIG. 1 or FIG. 2. As the bellows 14 and 16 extend alternately into channels 41 and 40, respectively, positive pressure pulses are generated in these channels.

Figure 5A:
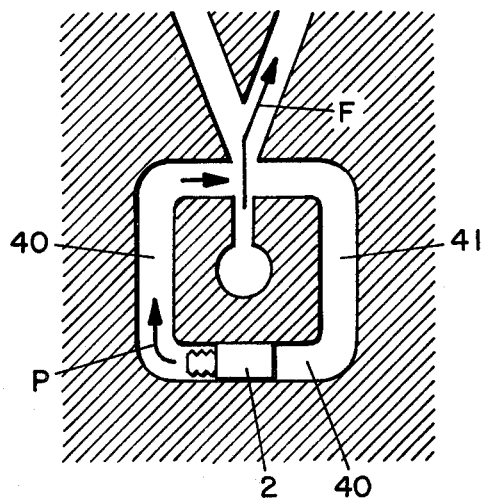
FIGS. 5A and 5B illustrate the manner in which a device as shown in FIG. 1 or FIG. 2 may be used to control the flow of fluid in a fluid amplification device.
Figure 5B:
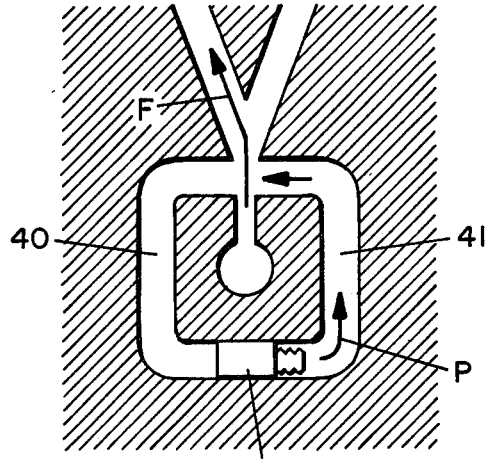

As shown in FIG. 5A, when a pressure pulse P is generated in channel 40, fluid flow F through the fluid amplification device will be deflected toward the right-most outlet channel. When the plunger of the actuator moves to the right as shown in FIG. 5B, the pressure pulse P generated in channel 41 will deflect the flow F to the left-most output channel of the amplification device.

Figure 6A:
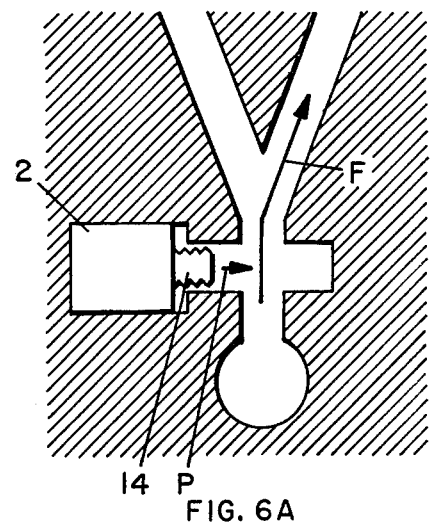
FIGS. 6A and 6B illustrate the manner in which a device as shown in FIG. 3 may be utilized to control the flow of fluid in a fluid amplification device.
Figure 6B:
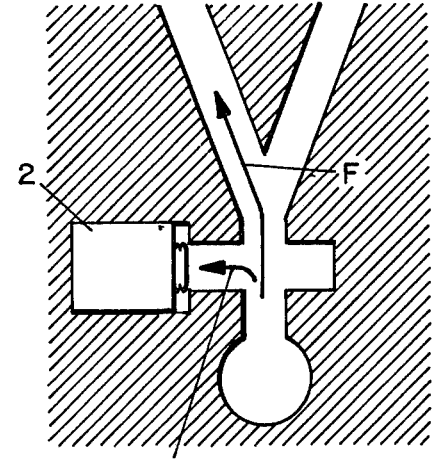

FIGS. 6A and 6B illustrate the manner in which the device as shown in FIG. 3 will control fluid flow through an amplification device. As shown in FIG. 6A, when the bellows 14 is extended by the actuator 2 a positive pulse P will deflect the flow F to the right-most outlet channel. When the bellows is retracted by the actuator, as shown in FIG. 6B, the negative pressure pulse P will deflect the flow F to the left-most channel of the fluid amplification device.

Figure 7:
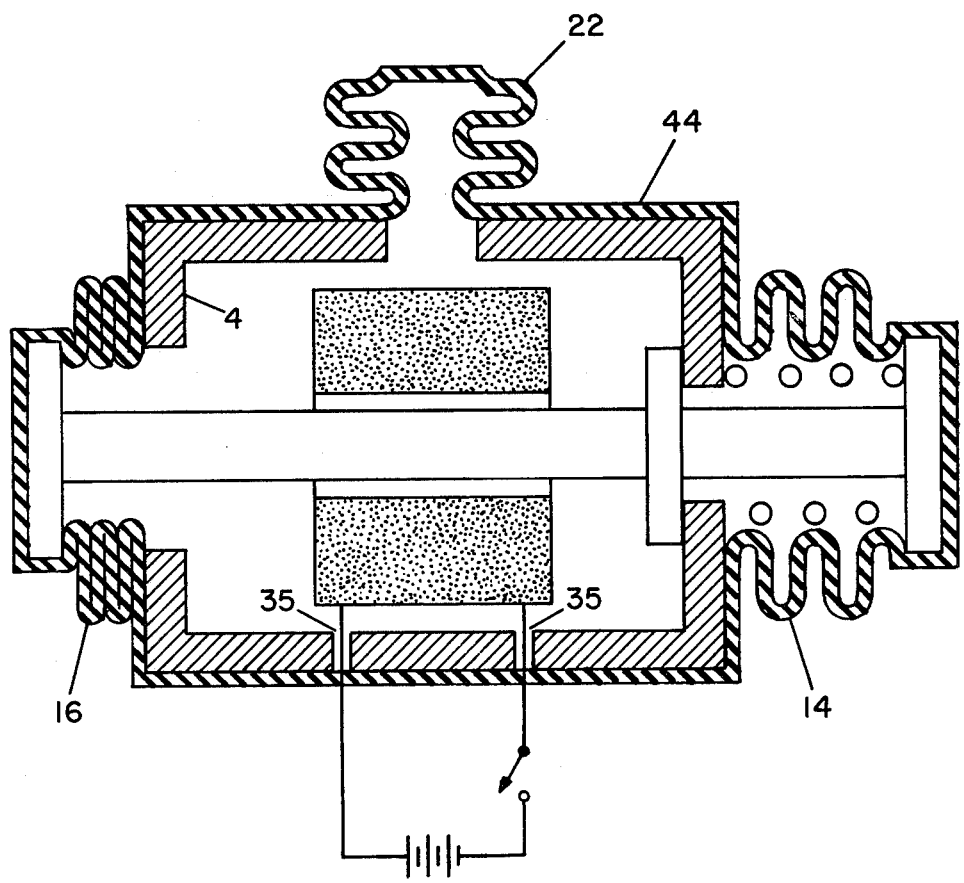
FIG. 7 illustrates another embodiment of the present invention which comprises an integral sealing means over the entire actuator.

FIG. 7 illustrates a modified form of the invention. In the device of FIG. 7 an integral bladder element 44 is formed over the entire actuator device. This may be formed, for example, by molding an envelope of rubber or like material about the device. Portions of the bladder overlie the housing 4 in intimate contact therewith, while other portions of the bladder form the diaphragms or bellows 14, 16 and 22. Use of the integral bladder of FIG. 7 eliminates the need for securing each metallic bellows individually to the housing 4 as in the other embodiments described. The bladder also provides for fluid tight seals at the openings 35, thus eliminating the need to seal these openings with epoxy or the like. In all other respects, the embodiment of FIG. 7 operates in the same manner as the previously described form of the invention. While FIG. 7 shows a single coil and a spring, as shown in FIG. 1, it is to be understood that the internal working elements of such an embodiment could comprise the dual coils as shown in FIG. 2. Also, the bladder enclosure shown in FIG. 7 could comprise a single working bellows 14, as shown in FIG. 3, rather than dual bellows 14 and 16 as shown.

The pressure balanced design of the actuator of the present invention enables it to operate at very high fluid pressures with only minimal electrical power. This is extremely advantageous in applications such as bore hole telemetry wherein power is severely limited. The highly compliant, lightweight low inertia bellows materials also provide for lower power consumption.

The pressure balanced design also eliminates most substantial stresses on the structural elements of the actuator of the present invention. Also, complete isolation of the internal components from the working fluids eliminates the erosive and corrosive effects of these fluids. The actuator is therefore extremely durable as compared to such devices known in the prior art.

Operating temperatures are limited only by magnetic circuit restrictions. Depending on coil design, digital or analog output signals may be provided by the device of the present invention. The short stroke of the plunger which is possible with the present device (0.05 inches) makes it suitable for use in extremely confined locations, such as a mud pulse telemetry transmitter.

While the invention has been disclosed with reference to the accompanying drawings, I do not wish to be limited to the details shown therein as obvious modifications can be made by one of ordinary skill in the art.

I claim:

1. An actuator for converting electrical signals into power pulses in a working fluid, comprising a sealed, fluid-tight enclosure, including:
    a housing having a plurality of openings therein, and
    a like plurality of lightweight, low inertia bellows having open end portions which adjoin the housing in intimate contact therewith and which are aligned respectively with the housing openings, opposite closed end portions having one side in contact with the working fluid, and intermediate side portions which are highly compliant to movement of the closed end portions relative to the opposite open end portions and adjoining housing, the plurality of bellows including first and second working bellows and a pressure equalizing bellows;
    electromechanical means, connected within the sealed enclosure between the housing and the closed end of each working bellows, for moving the closed end of each working bellows relative to the housing in accordance with the electrical signals to generate corresponding power pulses in the working fluid adjacent each working bellows, said electromechanical means comprising
        a movable shaft having one end connected to the closed end of the first bellows and an opposite end connected to the closed end of the second bellows,
        a coil for urging said shaft in a first direction, and
        a spring for urging said shaft in a second direction; and
    pressure equalizing means for equalizing pressure within the housing with pressure of the working fluid in contact with the pressure equalizing bellows, including
        an electrically non-conductive liquid which is disposed within and fills the sealed enclosure, and
        the pressure equalizing bellows, which serves as a freely movable interface between the non-conductive liquid within the housing and the working fluid in contact with the pressure equalizing bellows.

2. An actuator, as described in claim 1, wherein the housing and the plurality of bellows are formed of metallic material, and each bellows is secured at its open end portion to the housing by a metallic bond extending about the adjacent housing opening.

3. An actuator, as described in claim 1, wherein each bellows is an integral portion of a bladder of rubber or like material which completely encloses the housing, the bladder including further portions which overlie the housing in intimate contact therewith.

4. An actuator as described in claim 1, further comprising, in combination;
    a fluid amplification device having control ports for controlling the flow of fluid in said device,
    fluid passages communicating with said control ports,
    means for mounting said actuator in communication with said fluid passages whereby said power pulse will be generated in said fluid passages, and
    means facilitating fluid communication between the fluid flowing through the amplification device and said means to equalize pressure.

5. The combination as described in claim 4, wherein said fluid amplification device and said electromechanical actuator form part of a mud-pulse telemetry system, and said amplification device and electromechanical actuator cooperate to generate pressure pulses in the fluid flowing through the amplification device.

* * * * *